United States Patent
Danila et al.

(10) Patent No.: US 11,276,400 B2
(45) Date of Patent: *Mar. 15, 2022

(54) USER-PROGRAMMABLE AUTOMATED ASSISTANT

(71) Applicant: Google LLC, Mountain View, CA (US)

(72) Inventors: Mihai Danila, Bronxville, NY (US); Albry Smither, Kearny, NJ (US)

(73) Assignee: Google LLC, Mountain View, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/549,457

(22) Filed: Aug. 23, 2019

(65) Prior Publication Data

US 2019/0378510 A1    Dec. 12, 2019

Related U.S. Application Data

(63) Continuation of application No. 15/724,217, filed on Oct. 3, 2017, now Pat. No. 10,431,219.

(51) Int. Cl.
*G10L 15/22* (2006.01)
*G10L 15/18* (2013.01)
(Continued)

(52) U.S. Cl.
CPC .......... *G10L 15/22* (2013.01); *G06F 40/279* (2020.01); *G06F 40/35* (2020.01);
(Continued)

(58) Field of Classification Search
CPC . G10L 15/22; G10L 15/1815; G10L 15/1822; G10L 13/00; G10L 15/183;
(Continued)

(56) References Cited

U.S. PATENT DOCUMENTS

| 5,936,623 A | 8/1999 | Amro |
| 6,118,939 A * | 9/2000 | Nack ................... G06F 9/451 717/109 |

(Continued)

FOREIGN PATENT DOCUMENTS

| CN | 105027197 | 11/2015 |
| CN | 106558307 | 4/2017 |

(Continued)

OTHER PUBLICATIONS

Dusek, O., et al.; A Context-aware Natural Language Generator for Dialogue Systems; SIGDIAL; pp. 185-190; Czech Republic; dated Sep. 2016.

(Continued)

*Primary Examiner* — Vijay B Chawan
(74) *Attorney, Agent, or Firm* — Middleton Reutlinger

(57) ABSTRACT

Techniques described herein relate to allowing users to employ voice-based human-to-computer dialog to program automated assistants with customized routines, or "dialog routines," that can later be invoked to accomplish task(s). In various implementations, a first free form natural language input—that identifies a command to be mapped to a task and slot(s) required to be filled with values to fulfill the task—may be received from a user. A dialog routine may be stored that includes a mapping between the command and the task, and which accepts, as input, value(s) to fill the slot(s). Subsequent free form natural language input may be received from the user to (i) invoke the dialog routine based on the mapping, and/or (ii) to identify value(s) to fill the slot(s). Data indicative of at least the value(s) may be transmitted to a remote computing device for fulfillment of the task.

20 Claims, 5 Drawing Sheets

(51) Int. Cl.
  *G10L 25/51* (2013.01)
  *G10L 15/30* (2013.01)
  *G06F 40/35* (2020.01)
  *G06F 40/279* (2020.01)

(52) U.S. Cl.
  CPC .......... *G10L 15/1815* (2013.01); *G10L 15/30* (2013.01); *G10L 25/51* (2013.01); *G10L 2015/223* (2013.01); *G10L 2015/225* (2013.01)

(58) Field of Classification Search
  CPC ....... G10L 15/265; G10L 21/06; G10L 15/08; G10L 13/043; G10L 15/193; G10L 15/32; G06F 3/167; G06F 3/04842; G06F 3/0481; G06F 3/04817; G06F 3/16; G06F 40/279; G06F 40/30; G06F 40/40; G06N 3/006; G06N 5/022; G06N 5/041
  USPC ........... 704/9, 257, 246, 247, 251, 252, 270, 704/270.1, 275; 715/781, 784, 804, 866, 715/973; 707/107, 108, 109
  See application file for complete search history.

(56) References Cited

U.S. PATENT DOCUMENTS

| | | | |
|---|---|---|---|
| 6,272,672 | B1 | 8/2001 | Conway |
| 7,496,357 | B2 | 2/2009 | Dunn et al. |
| 8,892,446 | B2* | 11/2014 | Cheyer ............... G10L 15/1815 704/275 |
| 8,930,191 | B2* | 1/2015 | Gruber .................. G06N 5/022 704/257 |
| 9,189,742 | B2 | 11/2015 | London |
| 9,275,641 | B1* | 3/2016 | Gelfenbeyn ............ G10L 15/22 |
| 10,083,688 | B2* | 9/2018 | Piernot ................... G10L 15/22 |
| 10,431,219 | B2* | 10/2019 | Danila ................. G10L 15/1815 |
| 2002/0133347 | A1 | 9/2002 | Schoneburg et al. |
| 2004/0085162 | A1* | 5/2004 | Agarwal ................. G10L 15/22 333/196 |
| 2006/0009973 | A1* | 1/2006 | Nguyen .............. H04M 3/4936 704/257 |
| 2007/0106497 | A1 | 5/2007 | Ramsey et al. |
| 2007/0203693 | A1 | 8/2007 | Estes |
| 2009/0150156 | A1* | 6/2009 | Kennewick ............. G10L 15/00 704/257 |
| 2011/0016421 | A1 | 1/2011 | Krupka et al. |
| 2011/0078105 | A1 | 3/2011 | Wallace |
| 2013/0110518 | A1 | 5/2013 | Gruber et al. |
| 2013/0110519 | A1 | 5/2013 | Cheyer et al. |
| 2013/0111487 | A1* | 5/2013 | Cheyer ............. H04M 1/72448 718/102 |
| 2013/0290321 | A1 | 10/2013 | Shapira et al. |
| 2014/0310001 | A1 | 10/2014 | Kalns et al. |
| 2014/0380263 | A1 | 12/2014 | Gabel et al. |
| 2016/0217784 | A1* | 7/2016 | Gelfenbeyn ........ G06F 3/04842 |
| 2017/0116982 | A1* | 4/2017 | Gelfenbeyn ........ G10L 15/1815 |
| 2018/0314532 | A1* | 11/2018 | Badr ...................... G06Q 10/00 |

FOREIGN PATENT DOCUMENTS

| | | |
|---|---|---|
| JP | 2004234273 | 8/2004 |
| JP | 201421475 | 2/2014 |

OTHER PUBLICATIONS

David, Eric; AI Startup Aiqudo Raises $5.2M to make voice assistants Better; https://SILICONANGLE.com; 4 Pages; dated Jul. 2017.
Goddeau, D. et al.; Fast Reinforcement Learning of Dialog Strategies; IEEE ; 4 Pages; dated Jun. 2000.
Jaech, A. et al.; Domain Adapatation of Recurrent Neural Networks for Natural Language Understanding; 5 Pages; dated 2016.
Bordes, A. et al.; Learning End-to-End Goal-Oriented Dialog; Facebook AI Research; pp. 1-15; US; dated 2017.
Lazarevich, K., "Compare NLP Engines: Wit.ai, Lex, API.ai, Luis.ai, Watson Assistant", Digiteum, retrieved from internet on Jan. 1, 2019, URL:https://www.digiteum.com/nlp-engines-for-chatbots, 17 pages, dated Jun. 22, 2017 Jun. 22, 2017.
Juratsky, D., et al., "Dialogue and Conversational Agents", Speech and Language Processing, Prentice-Hall, Pearson Higher Education, XP055538951, ISBN: 978-0-13-187321-6, 48 pages, dated May 16, 2008 May 16, 2008.
European Patent Office; International Search Report and Written Opinion of PCT Ser. No. PCT/US2018/053937, 19 pages, dated Jan. 14, 2019 Jan. 14, 2019.
Chinese Patent Office; Office Action issued for Application No. 201880039314.9 dated Jul. 24, 2020.
Korean Patent Office; Notice of Allowance issued in Application No. 10-2019-7036462; 3 pages; dated Sep. 6, 2021.
Japanese Patent Office; Notice of Allowance issued in Application No. 2019-568319; 3 pages; dated Apr. 19, 2021.
Patent Office Japan: Office Action issued for Application No. 2019-568319 dated Oct. 12, 2020.
Korean Patent Office; Notice of Office Action issued in Application No. 10-2019-7036462; 6 pages; dated Mar. 17, 2021.
Chinese Patent Office; Notice of Allowance issued for Application No. 201880039314.9; 4 pages; dated Nov. 23, 2020.
European Patent Office; Examination Report, Communication pursuant to Article 94(3) EPC issued in EP Application No. 18793329.6; 10 pages dated Dec. 16, 2021.

* cited by examiner

USER-PROGRAMMABLE AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input.

Typically, automated assistants are configured to perform a variety of tasks, e.g., in response to a variety of predetermined canonical commands to which the tasks are mapped. These tasks can include things like ordering items (e.g., food, products, services, etc.), playing media (e.g., music, videos), modifying a shopping list, performing home control (e.g., control a thermostat, control one or more lights, etc.), answering questions, booking tickets, and so forth. While natural language analysis and semantic processing enable users to issue slight variations of the canonical commands, these variations may only stray so far before natural language analysis and semantic processing are unable to determine which task to perform. Put simply, task-oriented dialog management, in spite of many advances in natural language and semantic analysis, remains relatively rigid. Additionally, users often are unaware of or forget canonical commands, and hence may be unable to invoke automated assistants to perform many tasks of which they are capable. Moreover, adding new tasks requires third party developers to add new canonical commands, and it typically takes time and resources for automated assistants to learn acceptable variations of those canonical commands.

SUMMARY

Techniques are described herein for allowing users to employ voice-based human-to-computer dialog to program automated assistants with customized routines, or "dialog routines," that can later be invoked to accomplish a task. In some implementations, a user may cause an automated assistant to learn a new dialog routine by providing free form natural language input that includes a command to perform a task. If the automated assistant is unable to interpret the command, the automated assistant may solicit clarification from the user about the command. For example, in some implementations, the automated assistant may prompt the user to identify one or more slots that are required to be filled with values in order to fulfill the task. In other implementations, the user may identify the slots proactively, without prompting from the automated assistant. In some implementations, the user may provide, e.g., at the request of the automated assistant or proactively, an enumerated list of possible values to fill one or more of the slots. The automated assistant may then store a dialog routine that includes a mapping between the command and the task, and which accepts, as input, one or more values to fill the one or more slots. The user may later invoke the dialog routine using free form natural language input that includes the command or some syntactic/semantic variation thereof.

The automated assistant may take various actions once the dialog routine is invoked and slots of the dialog routine are filled by the user with values. In some implementations, the automated assistant may transmit data indicative of at least the user-provided slots, the slots themselves, and/or data indicative of the command/task, to a remote computing system. In some cases, this transmission may cause the remote computing system to output natural language output or other data indicative of the values/slots/command/task, e.g., to another person. This natural language output may be provided to the other person in various ways (which may not require the other person to install or configure its own third-party software agent to handle the request), e.g., via an email, text message, automated phone call, etc. That other person may then fulfill the task.

Additionally or alternatively, in some implementations, various aspects of a dialog routine, such as the slots, potential slot values, the command, etc., may be compared to similar components of a plurality of known candidate tasks (e.g., for which the user didn't know the canonical command). A mapping may be generated between the best-matching candidate task and the user's command, such that future use of the command (or a syntactic and/or semantic variation thereof) by the user to the automated assistant will invoke the dialog routine, and, ultimately, the best-matching candidate task. If multiple candidate tasks match the dialog routine equally, the user may be prompted to select one task, or other signals such as the user's context, prior application usage, etc., may be used to break the tie.

Suppose a user engages an automated assistant in the following dialog:
- User: "I want a pizza"
- AA: "I don't know how to order a pizza"
- User: "to order a pizza, you need to know the type of crust and a list of toppings"
- AA: "what are the possible pizza crust types?"
- User: "thin crust or thick crust"
- AA: "what are the possible toppings?"
- User: "here are the possible values"
- AA: "okay, ready to order a pizza?"
- User: "yes, get me a thin crust pizza with a tomato topping"

The command in this scenario is "I want a pizza," and the task is ordering a pizza. The user-defined slots that are required to be filled in order to fulfill the task include a type of crust and a list of toppings.

In some implementations, the task of ordering the pizza may be accomplished by providing natural language output, e.g., via an email, text message, automated phone call, etc., to a pizza store (which the user may specify or which may be selected automatically, e.g., based on distance, ratings, price, known user preferences, etc.). An employee of the pizza store may receive, via output of one or more computing devices (e.g., a computer terminal in the store, the employee's phone, a speaker in the store, etc.) the natural language output, which may say something like "<User>would like to order a <crust_style>pizza with <topping 1, topping 2, . . . >."

In some implementations, the pizza shop employee may be asked to confirm the user's request, e.g., by pressing "1" or by saying "OK," "I accept," etc. Once that confirmation is received, in some implementations, the requesting user's automated assistant may or may not provide confirmatory output, such as "your pizza is on the way." In some implementations, the natural language output provided at the pizza store may also convey other information, such as payment information, the user's address, etc. This other information may be obtained from the requesting user while creating the dialog routine or determined automatically, e.g., based on the user's profile.

In other implementations in which the command is mapped to a predetermined third party software agent (e.g., a third party software agent for a particular pizza shop), the task of ordering the pizza may be accomplished automatically via the third party software agent. For example, the information indicative of the slots/values may be provided to the third party software agent in various forms. Assuming all required slots are filled with appropriate values, the third party software agent may perform the task of placing an order of pizza for the user. If by some chance the third party software agent requires additional information (e.g., additional slot values), it may interface with the automated assistant to cause the automated assistant to prompt the user for the requested additional information.

Techniques described herein may give rise to a variety of technical advantages. As noted above, task-based dialog management is currently handled mostly with canonical commands that are created and mapped to predefined tasks manually. This is limited in its scalability because it requires third-party developers to create these mappings and inform users of them. Likewise, it requires the users to learn the canonical commands and remember them for later use. For these reasons, users with limited abilities to provide input to accomplish tasks, such as users with physical disabilities and/or users that are engaged in other tasks (e.g., driving), may have trouble causing automated assistants to perform tasks. Moreover, when users attempt to invoke a task with an uninterpretable command, additional computing resources are required to disambiguate the user's request or otherwise seek clarification. By allowing users to create their own dialog routines that are invoked using custom commands, the users are more likely to remember the commands and/or be able to successfully and/or more quickly accomplish tasks via automated assistants. This may preserve computing resources that might otherwise be required for the aforementioned disambiguation/clarification. Moreover, in some implementations, user-created dialog routines may be shared with other users, enabling automated assistants to be more responsive to "long tail" commands from individual users that might be used by others.

In some implementations, a method performed by one or more processors is provided that includes: receiving, at one or more input components of a computing device, a first free form natural language input from a user, wherein the first free form natural language input includes a command to perform a task; performing semantic processing on the free form natural language input; determining, based on the semantic processing, that an automated assistant is unable to interpret the command; providing, at one or more output components of the computing device, output that solicits clarification from the user about the command; receiving, at one or more of the input components, a second free form natural language input from the user, wherein the second free form natural language input identifies one or more slots that are required to be filled with values in order to fulfill the task; storing a dialog routine that includes a mapping between the command and the task, and which accepts, as input, one or more values to fill the one or more slots; receiving, at one or more of the input components, a third free form natural language input from the user, wherein the third free form natural language input invokes the dialog routine based on the mapping; identifying, based on the third free form natural language input or additional free form natural language input, one or more values to be used to fill the one or more slots that are required to be filled with values in order to fulfill the task; and transmitting, to a remote computing device, data that is indicative of at least the one or more values to be used to fill the one or more slots, wherein the transmitting causes the remote computing device to fulfill the task.

These and other implementations of technology disclosed herein may optionally include one or more of the following features.

In various implementations, the method may further include: comparing the dialog routine to a plurality of candidate tasks that are performable by the automated assistant; and based on the comparing, selecting the task to which the command is mapped from the plurality of candidate tasks. In various implementations, the task to which the command is mapped comprises a third-party agent task, wherein the transmitting causes the remote computing device to perform the third-party agent task using the one or more values to fill the one or more slots. In various implementations, the comparing may include comparing the one or more slots that are required to be filled in order to fulfill the task with one or more slots associated with each of the plurality of candidate tasks.

In various implementations, the method may further include receiving, at one or more of the input components prior to the storing, a fourth free form natural language input from the user. In various implementations, the fourth free form natural language input may include a user-provided enumerated list of possible values to fill one or more of the slots. In various implementations, the comparing may include, for each of the plurality of candidate tasks, comparing the user-provided enumerated list of possible values to an enumerated list of possible values for filling one or more slots of the candidate task.

In various implementations, the data that is indicative of at least the one or more values further may include one or both of an indication of the command or the task to which the command is mapped. In various implementations, the data that is indicative of at least the one or more values may take the form of natural language output that requests performance of the task based on the one or more values, and the transmitting causes the remote computing device to provide the natural language as output.

In another closely related aspect, a method may include: receiving, at one or more input components, a first free form natural language input from the user, wherein the first free form natural language input identifies a command that the user intends to be mapped to a task, and one or more slots that are required to be filled with values in order to fulfill the task; storing a dialog routine that includes a mapping between the command and the task, and which accepts, as input, one or more values to fill the one or more slots; receiving, at one or more of the input components, a second free form natural language input from the user, wherein the second free form natural language input invokes the dialog routine based on the mapping; identifying, based on the second free form natural language input or additional free form natural language input, one or more values to be used to fill the one or more slots that are required to be filled with values in order to fulfill the task; and transmitting, to a remote computing device, data that is indicative of at least the one or more values to be used to fill the one or more slots, wherein the transmitting causes the remote computing device to fulfill the task.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
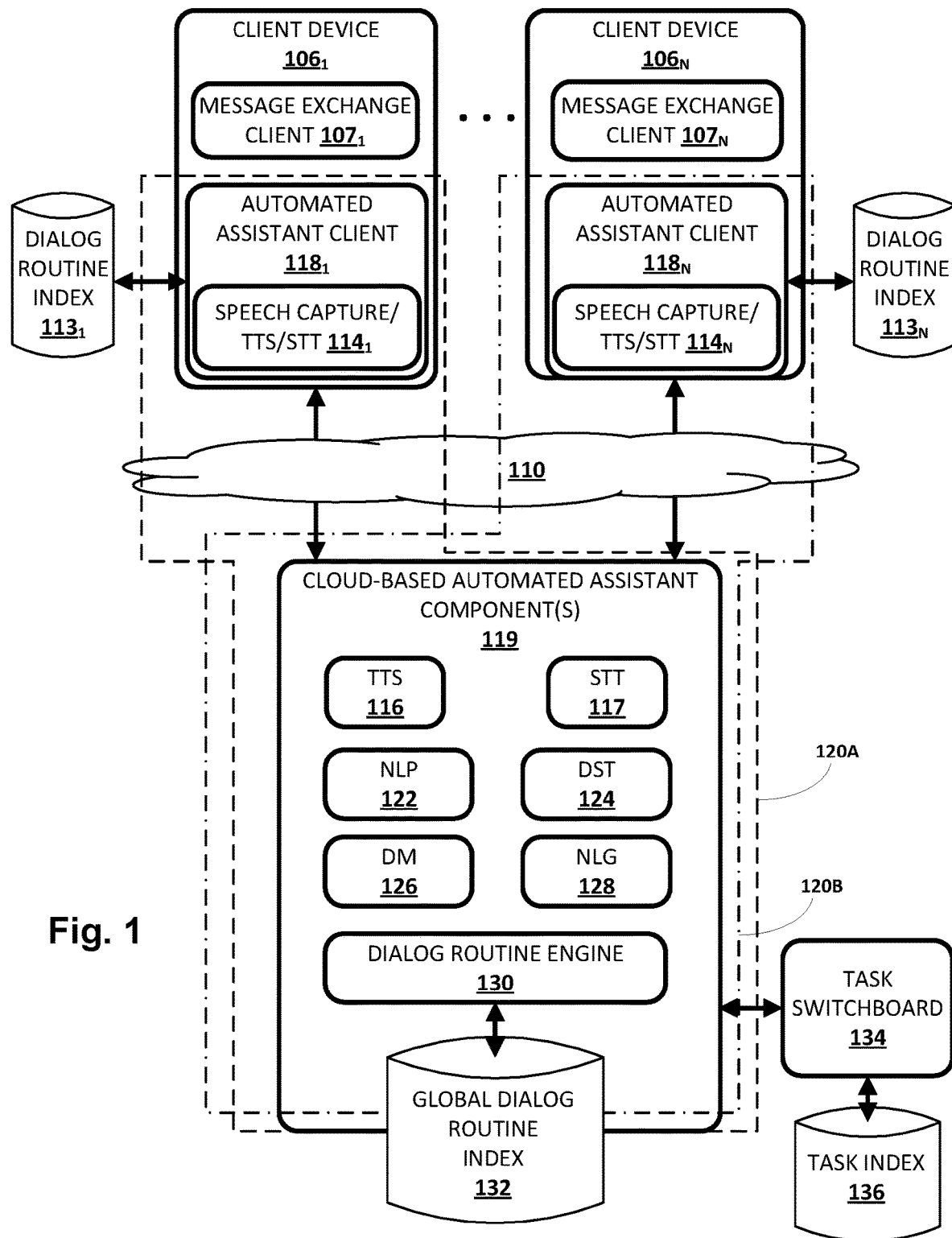
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at 110.

In some implementations, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119. It thus should be understood that in some implementations, each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

In various implementations, each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage interactive voice response ("IVR"), such that the user can utter commands, searches, etc., and the automated assistant may utilize natural language processing and/or one or more grammars to convert the utterances into text, and respond to the text accordingly. In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various implementations, each automated assistant client 118 may include a corresponding speech capture/text-to-speech ("TTS")/STT module 114. In other implementations, one or more aspects of speech capture/TTS/STT module 114 may be implemented separately from automated assistant client 118.

Each speech capture/TTS/STT module 114 may be configured to perform one or more functions: capture a user's speech, e.g., via a microphone (which in some cases may comprise presence sensor 105); convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language processor 122, the aforementioned TTS module 116, the aforementioned STT module 117, a dialog state tracker 124, a dialog manager 126, and a natural language generator 128 (which in some implementations may be combined with TTS module 116). In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in in response to free-form natural language input provided via one of the client devices $106_{1-N}$. As used herein, free-form natural language input is input that is formulated by a user and that is not constrained to a group of options presented for selection by the user.

As used herein, a "dialog session" may include a logically-self-contained exchange of one or more messages between a user and automated assistant 120 (and in some cases, other human participants) and/or performance of one or more responsive actions by automated assistant 120. Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 (alternatively referred to as a "natural language understanding engine") of automated assistant 120 processes free form natural language input generated by users via client devices $106_{1-N}$ and in some implementations may generate annotated output for use by one or more other components of automated assistant 120. For example, the natural language processor 122 may process natural language free-form input that is generated by a user via one or more user interface input devices of client device $106_1$. The generated annotated output may include one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger (not depicted) configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

In the context of task-oriented dialog, natural language processor 122 may be configured to map free form natural language input provided by a user at each turn of a dialog session to a semantic representation that may be referred to herein as a "dialog act." Semantic representations, whether dialog acts generated from user input other semantic representations of automated assistant utterances, may take various forms. In some implementations, semantic representations may be modeled as discrete semantic frames. In other implementations, semantic representations may be formed as vector embeddings, e.g., in a continuous semantic space.

In some implementations, a dialog act (or more generally, a semantic representation) may be indicative of, among other things, one or more slot/value pairs that correspond to parameters of some action or task the user may be trying to perform via automated assistant 120. For example, suppose a user provides free form natural language input in the form: "Suggest an Indian restaurant for dinner tonight." In some implementations, natural language processor 122 may map that user input to a dialog act that includes, for instance, parameters such as the following: intent(find_restaurant); inform(cuisine=Indian, meal=dinner, time=tonight). Dialog acts may come in various forms, such as "greeting" (e.g., invoking automated assistant 120), "inform" (e.g., providing a parameter for slot filling), "intent" (e.g., find an entity, order something), request (e.g., request specific information about an entity), "confirm," "affirm," and "thank_you" (optional, may close a dialog session and/or be used as positive feedback and/or to indicate that a positive reward value should be provided). These are just examples and are not meant to be limiting.

Dialog state tracker 124 may be configured to keep track of a "dialog state" that includes, for instance, a belief state of a user's goal (or "intent") over the course of a human-to-computer dialog session (and/or across multiple dialog sessions). In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 126 may be configured to map a current dialog state, e.g., provided by dialog state tracker 124, to one or more "responsive actions" of a plurality of candidate responsive actions that are then performed by automated assistant 120. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 120 outputting additional natural language dialog. This responsive dialog may include, for instance, requests that the user provide parameters for some action (i.e., fill slots) that dialog state tracker 124 believes the user intends to perform.

In some implementations, dialog manager 126 may include a machine learning model such as a neural network. In some such implementations, the neural network may take the form of a feed-forward neural network, e.g., with two hidden layers followed by a softmax layer. However, other configurations of neural networks, as well as other types of machine learning models, may be employed. In some implementations in which dialog manager 126 employs a neural network, inputs to the neural network may include, but are not limited to, a user action, a previous responsive action (i.e., the action performed by dialog manager in the previous turn), a current dialog state (e.g., a binary vector provided by dialog state tracker 124 that indicates which slots have been filled), an/or other values.

In various implementations, dialog manager 126 may operate at the semantic representation level. For example, dialog manager 126 may receive a new observation in the form of a semantic dialog frame (which may include, for instance, a dialog act provided by natural language processor 122 and/or a dialog state provided by dialog state tracker 124) and stochastically select a responsive action from a plurality of candidate responsive actions. Natural language generator 128 may be configured to map the responsive action selected by dialog manager 126 to, for instance, one or more utterances that are provided as output to a user at the end of each turn of a dialog session.

As noted above, in various implementations, users may be able to create customized "dialog routines" that automated assistant 120 may be able to effectively reenact later to accomplish various user-defined or user-selected tasks. In various implementations, a dialog routine may include a mapping between a command (e.g., a vocal free form natural language utterance converted to text or a reduced-dimensionality embedding, a typed free-form natural language input, etc.) and a task that is to be performed, in whole or in part, by automated assistant 120 in response to the command. In addition, in some instances a dialog routine may include one or more user-defined "slots" (also referred to as "parameters" or "attributes") that are required to be filled with values (also referred to herein as "slot values") in order to fulfill the task. In various implementations, a dialog routine, once created, may accept, as input, one or more values to fill the one or more slots. In some implementations, a dialog routine may also include, for one or more slots associated with the dialog routine, one or more user-enumerated values that may be used to fill the slots, although this is not required.

In various implementations, a task associated with a dialog routine may be performed by automated assistant 120 when one or more requires slots are filled with values. For instance, suppose a user invokes a dialog routine that requires two slots to be filled with values. If, during the invocation, the user provided values for both slots, then automated assistant 120 may use those provided slot values to perform the task associated with the dialog routine, without soliciting additional information from the user. Thus, it is possible that a dialog routine, when invoked, involves only a single "turn" of dialog (assuming the user provides all necessary parameters up front). On the other hand, if the user fails to provide a value for at least one required slot, automated assistant 120 may automatically provide natural language output that solicits values for the required-yet-unfilled slot.

In some implementations, each client device 106 may include a local dialog routine index 113 that is configured to store one or more dialog routines created by one or more users at that device. In some implementations, each local dialog routine index 113 may store dialog routines created at a corresponding client device 106 by any user. Additionally or alternatively, in some implementations, each local dialog routine index 113 may store dialog routines created by a particular user that operates a coordinated "ecosystem" of client devices 106. In some cases, each client device 106 of the coordinated ecosystem may store dialog routines created by the controlling user. For example, suppose a user creates a dialog routine at a first client device (e.g., 106₁) that takes the form of a standalone interactive speaker. In some implementations, that dialog routine may be propagated to, and stored in local dialog routine indices 113 of, other client devices 106 (e.g., a smart phone, a tablet computer, another speaker, a smart television, a vehicle computing system, etc.) forming part of the same coordinated ecosystem of client devices 106.

In some implementations, dialog routines created by individual users may be shared among multiple users. To this end, in some implementations, global dialog routine engine 130 may be configured to store dialog routines created by a plurality of users in a global dialog routine index 132. In some implementations, the dialog routines stored in global dialog routine index 132 may be available to selected users based on permissions granted by the creator (e.g., via one or more access control lists). In other implementations, dialog routines stored in global dialog routine index 132 may be freely available to all users. In some implementations, a dialog routine created by a particular user at one client device 106 of a coordinated ecosystem of client devices may be stored in global dialog routine index 132, and thereafter may be available to (e.g., for optional download or online usage) the particular user at other client devices of the coordinated ecosystem. In some implementations, global dialog routine engine 130 may have access both to globally available dialog routines in global dialog routine index 132 and locally-available dialog routines stored in local dialog routine indices 113.

In some implementations, dialog routines may be limited to invocation by their creator. For example, in some implementations, voice recognition techniques may be used to assign a newly-created dialog routine to a voice profile of its creator. When that dialog routine is later invoked, automated assistant 120 may compare the speaker's voice to the voice profile associated with the dialog routine. If there is a match, the speaker may be authorized to invoke the dialog routine. If the speaker's voice does not match the voice profile associated with the dialog routine, in some cases, the speaker may not be permitted to invoke the dialog routine.

In some implementations, users may create customized dialog routines that effectively override existing canonical commands and associated tasks. Suppose a user creates a new dialog routine for performing a user-defined task, and that the new dialog routine is invoked using a canonical command that was previously mapped to a different task. In the future, when that particular user invokes the dialog routine, the user-defined task associated with the dialog routine may be fulfilled, rather than the different task to which the canonical command was previously mapped. In some implementations, the user-defined task may only be performed in response to the canonical command if it is the creator-user that invokes the dialog routine (e.g., which may be determined by matching the speaker's voice to a voice profile of the creator of the dialog routine). If another user utters or otherwise provides the canonical command, the different task that is traditionally mapped to the canonical command may be performed instead.

Referring once again to FIG. 1, in some implementations, a task switchboard 134 may be configured to route data generated when dialog routines are invoked by users to one or more appropriate remote computing systems/devices, e.g., so that the tasks associated with the dialog routines can be fulfilled. While task switchboard 134 is depicted separately from cloud-based automated assistant components 119, this is not meant to be limiting. In various implementations, task switchboard 134 may form an integral part of automated assistant 120. In some implementations, data routed by task switchboard 134 to an appropriate remote computing device may include one or more values to be used to fill one or more slots associated with the invoked dialog routine. Additionally or alternatively, depending on the nature of the remote computing system(s)/device(s), the data routed by task switchboard 134 may include other pieces of information, such as the slots to be filled, data indicative of the invoking command, data indicative of the task to be performed (e.g., a user's perceived intent), and so forth. In some implementations, once the remote computing systems(s)/device(s) perform their role in fulfilling the task, they may return responsive data to automated assistant 120, directly and/or via task switchboard 134. In various implementations, automated assistant 120 may then generate (e.g., by way of natural language generator 128) a natural language output to provide to the user, e.g., via one or more audio and/or visual output devices of a client device 106 operated by the invoking user.

In some implementations, task switchboard 134 may be operably coupled with a task index 136. Task index 136 may store a plurality of candidate tasks that are performable in whole or in part (e.g., triggerable) by automated assistant 120. In some implementations, candidate tasks may include third party software agents that are configured to automatically respond to orders, engage in human-to-computer dialogs (e.g., as chatbots), and so forth. In various implementations, these third party software agents may interact with a user via automated assistant 120, wherein automated assistant 120 acts as an intermediary. In other implementations, particularly where the third party agents are themselves chatbots, the third party agents may be connected directly to the user, e.g., by automated assistant 120 and/or task switchboard 134. Additionally or alternatively, in some implementations, candidate tasks may include gathering information provided by a user into a particular form, e.g., with particular slots filled, and presenting that information (e.g., in a predetermined format) to a third party, such as a human being. In some implementations, candidate tasks may additionally or alternatively include tasks that do not necessarily require submission to a third party, in which case task switchboard 134 may not route information to remote computing device(s).

Suppose a user creates a new dialog routine to map a custom command to a yet-undetermined task. In various implementations, task switchboard 134 (or one or more components of automated assistant 120) may compare the new dialog routine to a plurality of candidate tasks in task index 136. For example, one or more user-defined slots associated with the new dialog routine may be compared with slots associated with candidate tasks in task index 136. Additionally or alternatively, one or more user-enumerated values that can be used to fill slots of the new dialog routine may be compared to enumerated values that can be used to fill slots associated with one or more of the plurality of candidate tasks. Additionally or alternatively, other aspects of the new dialog routine, such as the command-to-be-mapped, one or more other trigger words contained in the user's invocation, etc., may be compared to various attributes of the plurality of candidate tasks. Based on the comparing, the task to which the command is to be mapped may be selected from the plurality of candidate tasks.

Suppose a user creates a new dialog routine that is invoked with the command, "I want to order tacos." Suppose further that this new dialog routine is meant to place a food order with a to-be-determined Mexican restaurant (perhaps the user is relying on automated assistant 120 to guide the user to the best choice). The user may, e.g., by way of engaging in natural language dialog with automated assistant 120, define various slots associated with this task, such as shell type (e.g., crunchy, soft, flour, corn, etc.), meat selection, type of cheese, type of sauce, toppings, etc. In some implementations, these slots may be compared to slots-to-be-filled of existing third party food-ordering applications (i.e. third party agents) to determine which third-party agent is the best fit. There may be multiple third party agents that are configured to receive orders for Mexican food. For example, a first software agent may accept orders for predetermined menu items (e.g., without options for customizing ingredients). A second software agent may accept customized taco orders, and hence may be associated with slots such as toppings, shell type, etc. The new taco-ordering dialog routine, including its associated slots, may be compared to the first and second software agents. Because the second software agent has slots that are more closely aligned with those defined by the user in the new dialog routine, the second software agent may be selected, e.g., by task switchboard 134, for mapping with the command, "I want to order tacos" (or sufficiently syntactically/semantically similar utterances).

When a dialog routine defines one or more slots that are required to be filled in order for the task to be completed, it is not required that a user proactively fill these slots when initially invoking the dialog routine. To the contrary, in various implementations, when a user invokes a dialog routine, to the extent the user does not provide values for required slots during invocation, automated assistant 120 may cause (e.g., audible, visual) output to be provided, e.g., as natural language output, that solicits these values from the user. For example, with the taco-order dialog routine above, suppose the user later provides the utterance, "I want to order tacos." Because this dialog routine has slots that are required to be filled, automated assistant 120 may respond by prompting the user for values to fill in any missing slots (e.g., shell type, toppings, meat, etc.). On the other hand, in some implementations, the user can proactively fill slots when invoking the dialog routine. Suppose the user utters the phrase, "I want to order some fish tacos with hard shells." In this example, the slots for shell type and meat are already filled with the respective values "hard shells" and "fish." Accordingly, automated assistant 120 may only prompt the user for any missing slot values, such as toppings. Once all required slots are filled with values, in some implementations, task switchboard 134 may take action to cause the task to be performed.

Figure 2:
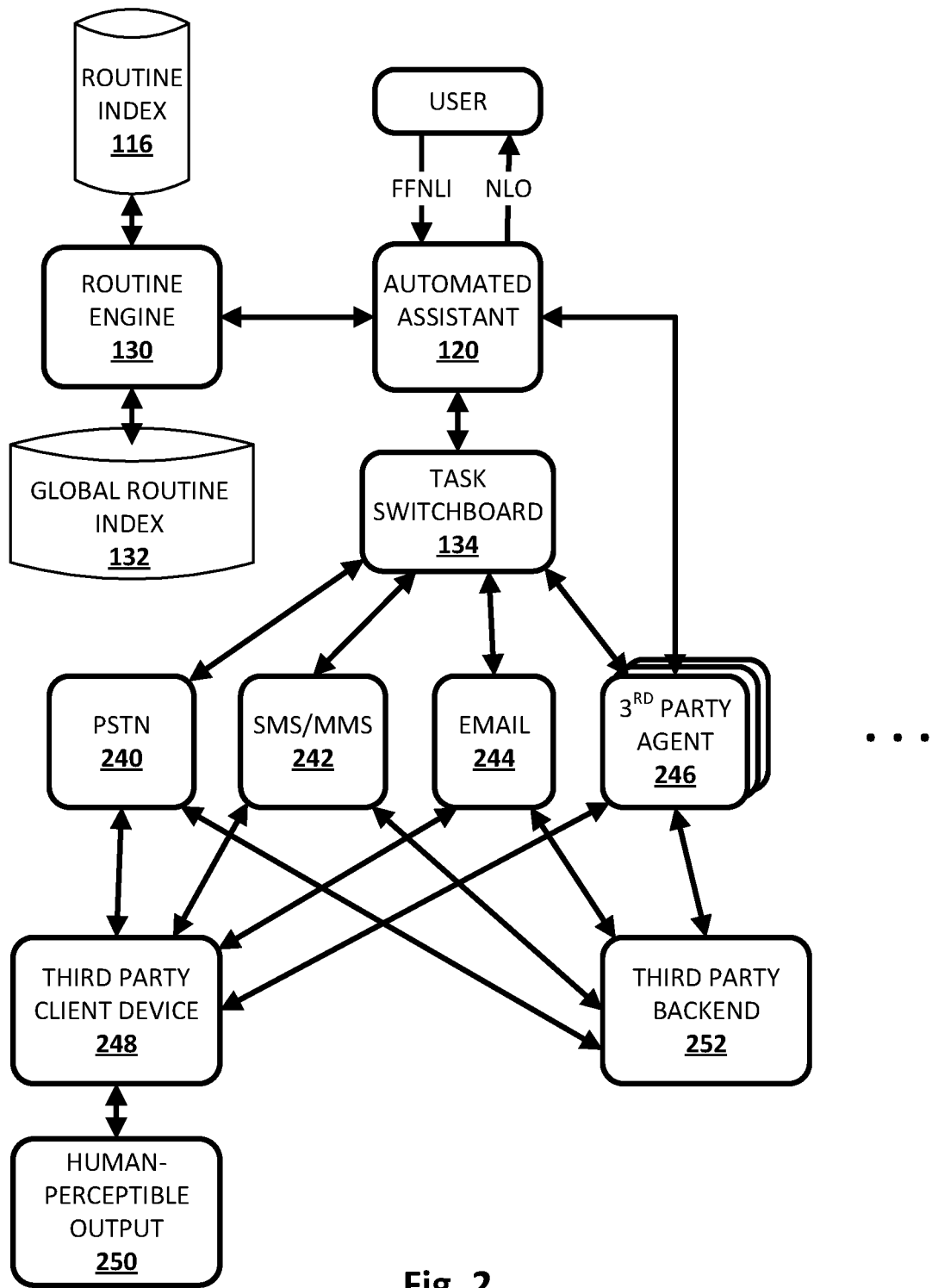
FIG. 2 schematically depicts one example of how data generated during invocation of a dialog routine may flow among various components, in accordance with various implementations.

FIG. 2 depicts one example of how free form natural language input ("FFNLI" in FIG. 2 and elsewhere) provided by a user may be used to invoke dialog routine, and how data gathered by automated assistant 120 as part of implementing the dialog routine may be propagated to various components for fulfillment of the task. The user provides (over one or more turns of a human-to-computer dialog session) FFNLI to automated assistant 120, in typed for or as spoken utterance(s). Automated assistant 120, e.g., by way of natural language processor 122 (not depicted in FIG. 2) and/or dialog state tracker 124 (also not depicted in FIG. 2), interprets and parses the FFNLI into various semantic information, such as a user intent, one or more slots to be filled, one or more values to be used to fill the slots, etc.

Automated assistant 120, e.g., by way of dialog manager 126 (not depicted in FIG. 2), may consult with dialog routine engine 130 to identify a dialog routine that includes a mapping between a command contained in the FFNLI provided by the user and a task. In some implementations, dialog routine engine 130 may consult with one or both of local dialog routine index 113 of the computing device operated by the user or global dialog routine index 132. Once automated assistant 120 selects a matching dialog routine (e.g., the dialog routine that includes an invocation command that is most semantically/syntactically similar to the command contained in the user's FFNLI), if necessary, automated assistant 120 may prompt the user for values to fill any unfilled and required slots for the dialog routine.

Once all necessary slots are filled, automated assistant 120 may provide data indicative of at least the values used to fill the slots to task switchboard 134. In some cases, the data may also identify the slots themselves and/or one or more tasks that are mapped to the user's command. Task switchboard 134 may then select what will be referred to herein as a "service" to facilitate performance of the task. For example, in FIG. 2, the services include public-switched telephone network ("PSTN") service 240, a service 242 for handling SMS and MMS messages, an email service 244, and one or more third party software agents 246. As indicated by the ellipses, any other number of additional services may or may not be available to task switchboard 134. These services may be used to route data indicative of invoked dialog routines, or simply "task requests," to one or more remote computing devices.

For example, PSTN service 240 may be configured to receive data indicative of an invoked dialog routine (including values to fill any required slots) and provide that data to a third party client device 248. In this scenario, third party client device 248 may take the form of a computing device that is configured to receive telephone calls, such as a cellular phone, a conventional telephone, a voice over IP ("VOI") telephone, a computing device configured to make/receive telephone calls, etc. In some implementations, the information provided to such a third party client device 248 may include natural language output that is generated, for instance, by automated assistant 120 (e.g., by way of natural language generator 128) and/or by PSTN service 240. This natural language output may include, for instance, computer-generated utterance(s) that convey a task to be performed and parameters (i.e. values of required slots) associated with the task, and/or enable the receiving party to engage in a limited dialog designed to enable fulfillment of the user's task (e.g., much like a robocall). This natural language output may be presented, e.g., by third party computing device 248, as human-perceptible output 250, e.g., audibly, visually, as haptic feedback, etc.

Suppose a dialog routine is created to place an order for pizza. Suppose further that a task identified (e.g., by the user or by task switchboard 134) for the dialog routine is to provide the user's pizza order to a particular pizza store that lacks its own third party software agent. In some such implementations, in response to invocation of the dialog routine, PSTN service 240 may place a telephone call to a telephone at the particular pizza store. When an employee at the particular pizza store answers the phone, PSTN service 240 may initiate an automated (e.g., IVR) dialog that informs the pizza store employee that the user wishes to order a pizza having the crust type and toppings specified by the user when the user invoked the dialog routine. In some implementations, the pizza store employee may be asked to confirm that the pizza store will fulfill the user's order, e.g., by pressing "1," providing oral confirmation, etc. Once this confirmation is received, it may be provided, e.g., to PSTN service 240, which may in turn forward confirmation (e.g., via task switchboard 134) to automated assistant 120, which may then inform the user that the pizza is on the way (e.g., using audible and/or visual natural language output such as "your pizza is on the way"). In some implementations, the pizza store employee may be able to request additional information that the user may not have specified when invoking the dialog routine (e.g., slots that were not designated during creation of the dialog routine).

SMS/MMS service 242 may be used in a similar fashion. In various implementations, SMS/MMS service 242 may be provided, e.g., by task switchboard 134, with data indicative of an invoked dialog routine, such as one or more slots/values. Based on this data, SMS/MMS service 242 may generate a text message in various formats (e.g., SMS, MMS, etc.) and transmit the text message to a third party client device 248, which once again may be a smart phone or another similar device. A person (e.g., a pizza shop employee) that operates third party client device 248 may then consume the text message (e.g., read it, have it read aloud, etc.) as human-perceptible output 250. In some implementations, the text message may request that the person provide a response, such as "REPLY '1' IF YOU CAN FULFILL THIS ORDER. REPLY '2' IF YOU CANNOT." In this manner, similar to the example described above with PTSN service 240, it is possible for a first user who invokes a dialog routine to exchange data asynchronously with a second user that operates third party device 248, in order that the second user can help fulfill a task associated with the invoked dialog routine. Email service 244 may operate similarly as SMS/MMS service 242, except that email service 244 utilizes email-related communication protocols, such as IMAP, POP, SMTP, etc., to generate and/or exchange emails with third party computing device 248.

Services 240-244 and task switchboard 134 enable users to create dialog routines to engage with third parties while reducing the requirements of third parties to implement complex software services that can be interacted with. However, at least some third parties may prefer to build, and/or have the capability of building, third party software agents 246 that are configured to interact with remote users automatically, e.g., by way of automated assistants 120 engaged by those remote users. Accordingly, in various implementations, one or more third party software agents 246 may be configured to interact with automated assistant(s) 120 and/or task switchboard 134 such that users are able to create dialog routines that can be matched with these third party agents 246.

Suppose a user creates a dialog routine that is matched (as described above) to a particular third party agent 246 based on slots, enumerated potential slot values, other information, etc. When invoked, the dialog routine may cause automated assistant 120 to send data indicative of the dialog routine, including user-provided slot values, to task switchboard 134. Task switchboard 134 may in turn provide this data to the matching third party software agent 246. In some implementations, the third party software agent 246 may perform the task associated with the dialog routine and return a result (e.g., a success/failure message, natural language output, etc.), e.g., to task switchboard 134.

As indicated by the arrow from third party agent 246 directly to automated assistant 120, in some implementations, third party software agent 246 may interface directly with automated assistant 120. For example, in some implementations, third party software agent 246 may provide data (e.g., state data) to automated assistant 120 that enables automated assistant 120 to generate, e.g., by way of natural language generator 128, natural language output that is then presented, e.g., as audible and/or visual output, to the user who invoked the dialog routine. Additionally or alternatively, third party software agent 246 may generate its own natural language output that is then provided to automated assistant 120, which in turn outputs the natural language output to the user.

As indicated by others of the various arrows in FIG. 2, the above-described examples are not meant to be limiting. For example, in some implementations, task switchboard 134 may provide data indicative of an invoked dialog routine to one or more services 240-244, and these services in turn may provide this data (or modified data) to one or more third party software agents 246. Some of these third party software agents 246 may be configured to receive, for instance, a text message or email, and automatically generate a response that can be returned to task switchboard 134 and onward to automated assistant 120.

Dialog routines configured with selected aspects of the present disclosure are not limited to tasks that are executed/fulfilled remotely from client devices 106. To the contrary, in some implementations, users may engage automated assistant 120 to create dialog routines that perform various tasks locally. As a non-limiting example, a user could create a dialog routine that configures multiple settings of a mobile device such as a smart phone at once using a single command. For example, a user could create a dialog routine that receives, as input, a Wi-Fi setting, a Bluetooth setting, and a hot spot setting all at once, and that changes these settings accordingly. As another example, a user could create a dialog routine that is invoked with the user says, "I'm gonna be late." The user may instruct automated assistant 120 that this command should cause automated assistant 120 to inform another person, such as the user's spouse, e.g., using text message, email, etc., that the user will be late arriving at some destination. In some cases, slots for such a dialog routine may include a predicted time the user will arrive at the user's intended destination, which may be filled by the user or automated predicted, e.g., by automated assistant 120, based on position coordinate data, calendar data, etc.

In some implementations, users may be able to configure dialog routines to use pre-selected slot values in particular slots, so that the user need not provide these slot values, and will not be prompted for those values when the user does not provide them. Suppose a user creates a pizza ordering dialog routine. Suppose further that that user always prefers thin crust. In various implementations, the user may instruct automated assistant 120 that when this particular dialog routine is invoked, the slot "crust type" should be automatically populated with the default value "thin crust" unless the user specifies otherwise. That way, if the user occasionally wants to order a different crust type (e.g., the user has visitors who prefer thick crust), the user can invoke the dialog routine as normal, except the user may specifically request a different type of crust, e.g., "Hey assistant, order me a hand-tossed pizza." Had the user simply said, "Hey assistant, order me a pizza," automated assistant 120 may have assumed thin crust and prompted the user for other required slot values. In some implementations, automated assistant 120 may "learn" over time which slot values a user prefers. Later, when the user invokes the dialog routine without explicitly providing those learned slot values, automated assistant 120 may assume those values (or ask the user to confirm those slot values), e.g., if the user has provided those slot values more than a predetermined number of times, or more than a particular threshold frequency of invoking the dialog routine.

Figure 3:
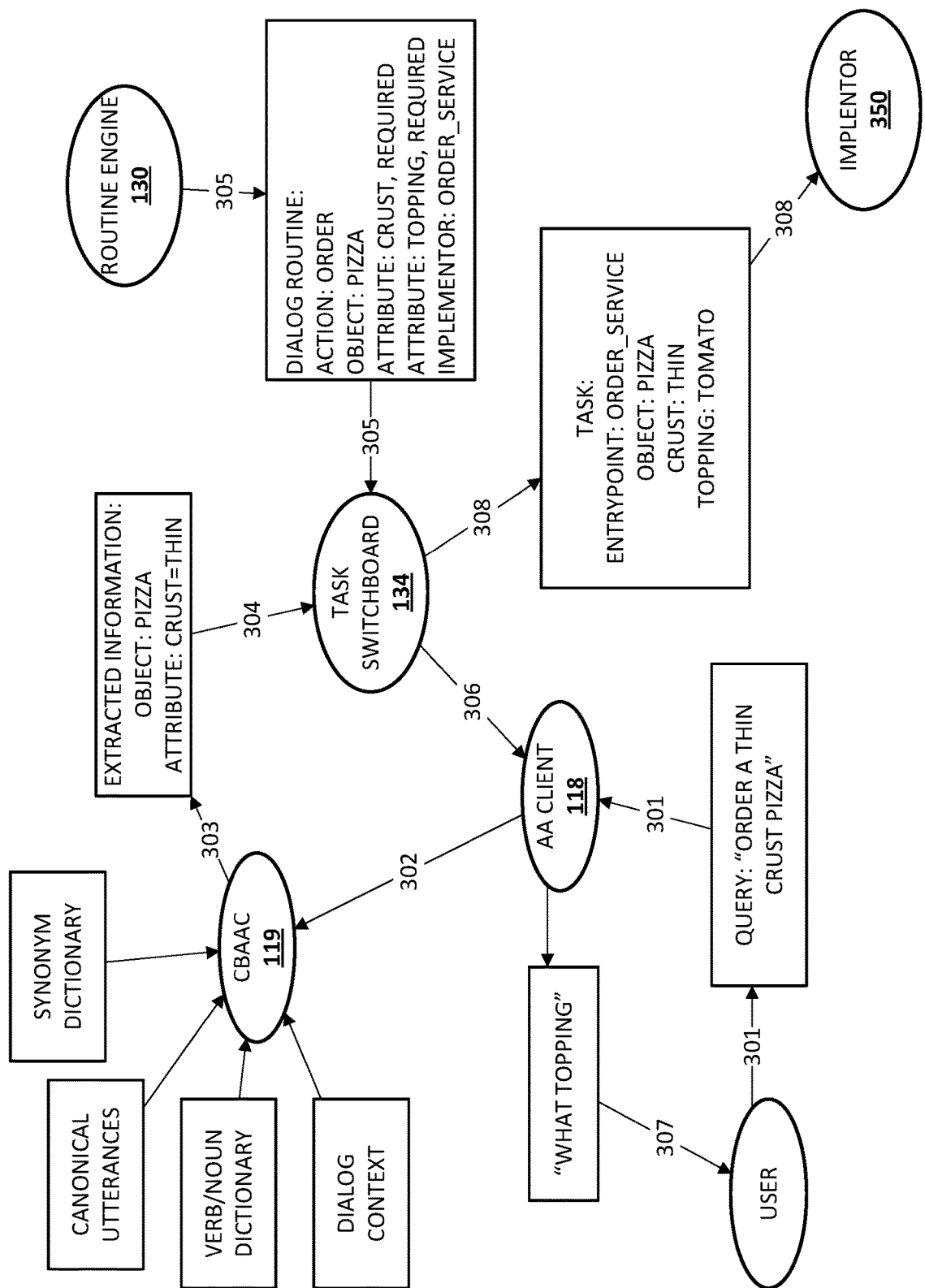
FIG. 3 demonstrates schematically one example of how data may be exchanged between various components on invocation of a dialog routine, in accordance with various implementations.

FIG. 3 depicts one example process flow that may occur when a user invokes a pizza ordering dialog routine, in accordance with various implementations. At 301, the user invokes a pizza ordering dialog routine by uttering, e.g., to automated assistant client 118, the invocation phrase, "Order a thin crust pizza." At 302, automated assistant client 118 provides the invocation phrase, e.g., as a recording, a transcribed textual segment, a reduced dimensionality embedding, etc., to cloud-based automated assistant components ("CBAAC") 119. At 303, various components of CBAAC 119, such as natural language processor 122, dialog state tracker 124, dialog manager 126, etc., may process the request as described above using various cues, such as dialog context, a verb/noun dictionary, canonical utterances, a synonym dictionary (e.g., a thesaurus), etc., to extract information such as an object of "pizza" and an attribute (or "slot value") of "thin crust."

At 304, this extracted data may be provided to task switchboard 134. In some implementations, at 305, task switchboard 134 may consult with dialog routine engine 130 to identify, e.g., based on the data extracted at 303 and received at 304, a dialog routine that matches the user's request. As shown in FIG. 3, in this example the identified dialog routine includes an action (which itself may be a slot) of "order," an object (which in some cases may also be a slot) of "pizza," an attribute (or slot) of "crust" (which is required), another attribute (or slot) of "topping" (which is also required), and a so-called "implementor" of "order_service." Depending on how the user created the dialog routine and/or whether the dialog routine was matched to a particular task (e.g., a particular third party software agent 246), the "implementor" may be, for instance, any of the services 240-244 of FIG. 2, and/or one or more third party software agents 246.

At 306, it may be determined, e.g., by task switchboard 134, that one or more required slots for the dialog routine are not yet filled with values. Consequently, task switchboard 134 may notify a component such as automated assistant 120 (e.g., automated assistant client 118 in FIG. 3, but it could be another component such as one or more CBAAC 119) that one or more slots remain to be filled with slot values. In some implementations, task switchboard 134 may generate the necessary natural language output (e.g., "what topping?") that prompts the user for these unfilled slots, and automated assistant client 118 may simply provide this natural language output to the user, e.g., at 307. In other implementations, the data provided to automated assistant client 118 may provide notice of the missing information, and automated assistant client 118 may engage with one or more components of CBAAC 119 to generate the natural language output that is presented to the user to prompt the user for the missing slot values.

Although not shown in FIG. 3 for the sakes of brevity and completeness, the user-provided slot values may be returned to task switchboard 134. At 308, with all required slots filled with user-provided slot values, task switchboard 134 may then be able to formulate a complete task. This complete task may be provided, e.g., by task switchboard 134, to the appropriate implementor 350, which as noted above may be one or more services 240-244, one or more third party software agents 246, and so forth.

Figure 4:
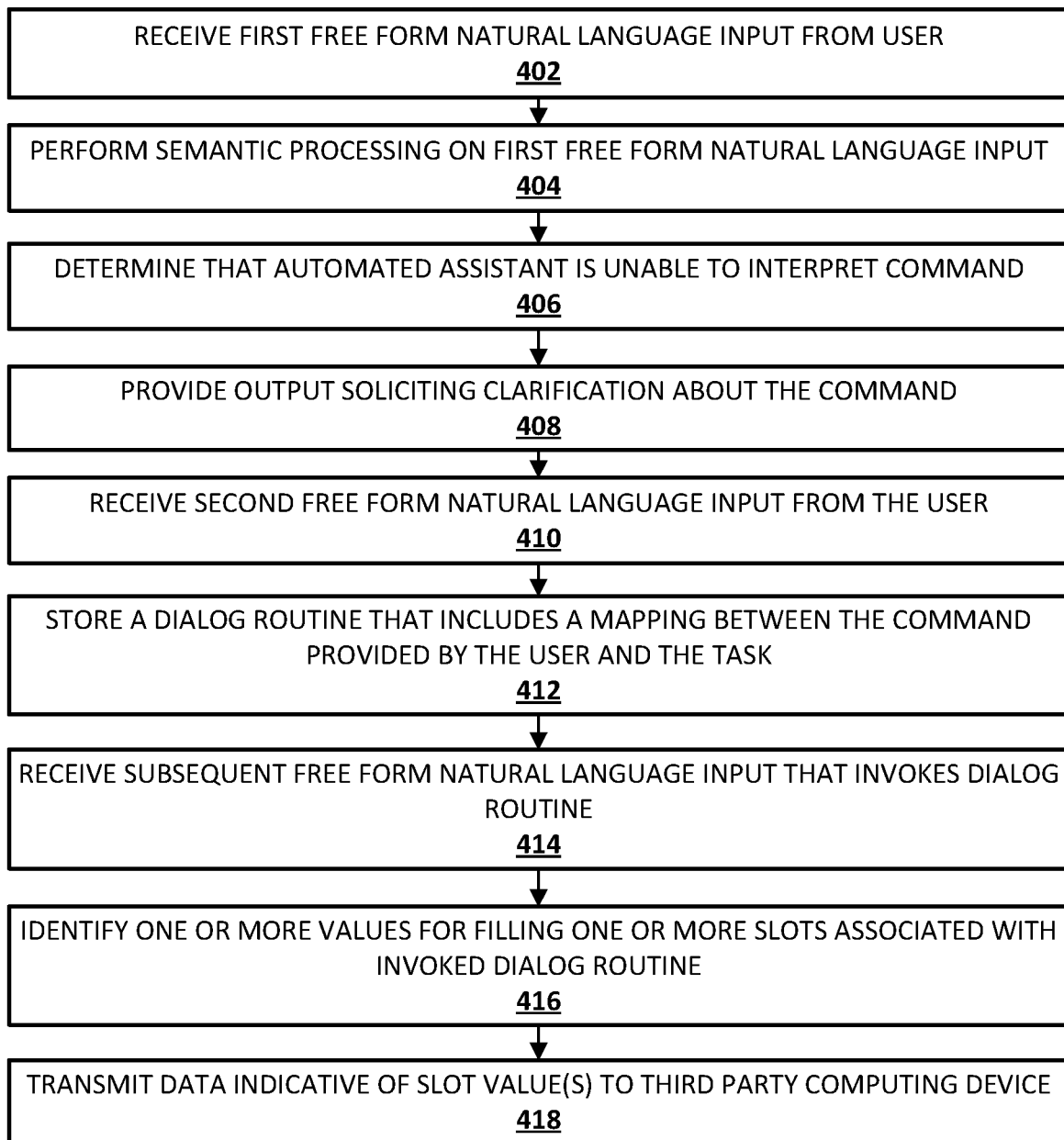
FIG. 4 depicts a flowchart illustrating an example method according to implementations disclosed herein.

FIG. 4 is a flowchart illustrating an example method 400 according to implementations disclosed herein. For convenience, the operations of the flow chart are described with reference to a system that performs the operations. This system may include various components of various computer systems, such as one or more components of computing systems that implement automated assistant 120. Moreover, while operations of method 400 are shown in a particular order, this is not meant to be limiting. One or more operations may be reordered, omitted or added.

At block 402, the system may receive, e.g., at one or more input components of a client device 106, a first free form natural language input from a user. In various implementations, the first free form natural language input may include a command to perform a task. As a working example, suppose a user provides the spoken utterance, "I want a pizza."

At block 404, the system may perform semantic processing on the free form natural language input. For example, one or more CBAAC 119 may compare the user's utterance (or a reduced dimensionality embedding thereof) to one or more canonical commands, to various dictionaries, etc. Natural language processor 122 may perform various aspects of the analysis described above to identify entities, perform co-reference resolution, label parts of speech, etc. At block 406, the system may determine, based on the semantic processing of block 404, that automated assistant 120 is unable to interpret the command. In some implementations, at block 408, the system may provide, at one or more output components of the client device 106, output that solicits clarification from the user about the command, such as outputting natural language output: "I don't know how to order a pizza."

At block 410, the system may receive, at one or more of the input components, a second free form natural language input from the user. In various implementations, the second free form natural language input may identify one or more slots that are required to be filled with values in order to fulfill the task. For example, the user may provide natural language input such as "to order a pizza, you need to know the type of crust and a list of toppings." This particular free form natural language input identifies two slots: crust type and a list of toppings (which technically could be any number of slots depending on how many toppings the user desires).

As alluded to above, in some implementations, a user may be able to enumerate a list of potential or candidate slot values for a given slot of a dialog routine. In some implementations, this may, in effect, constrain that slot to one or more values from the enumerated list. In some cases, enumerating possible values for slots may enable automated assistant 120 to determine which slot is to be filled with a particular value and/or to determine that a provided slot value is invalid. For example, suppose a user invokes a dialog routine with the phrase, "order me a pizza with thick crust, tomatoes, and tires." Automated assistant 120 may match "thick crust" to the slot "crust type" based on "thick crust" being one of an enumerated list of potential values. The same goes with "tomatoes" and the slot "topping." However, because "tires" are unlikely to be in an enumerated list of potential toppings, automated assistant 120 may ask the user for correction on the specified topping, tires. In other implementations, the user-provided enumerated list may simply include non-limiting potential slot values that may be used by automated assistant 120, for instance, as suggestions to be provided to the user during future invocations of the dialog routine. This may be beneficial in contexts such as pizza ordering in which the list of possible pizza toppings is potentially large, and may vary greatly across pizza establishments and/or over time (e.g., a pizza shop may offer different toppings at different times of the year, depending on what produce is in season).

Continuing with the working example, automated assistant 120 may ask questions such as, "what are the possible pizza crust types?", or "what are the possible toppings?" The user may respond to each such question by providing enumerated lists of possibilities, as well as indicating whether the enumerated lists are meant to be constraining (i.e. no slot values outside of those enumerated are permitted) or simply exemplary. In some cases the user may respond that a given slot is not limited to particular values, such that automated assistant 120 is unconstrained and can populate that slot with whatever slot value the user provides.

Returning to FIG. 4, once the user has completed defining any required/optional slots and/or enumerating lists of potential slot values, at block 412, the system, e.g., dialog routine engine 130, may store a dialog routine that includes a mapping between the command provided by the user and the task. The created dialog routine may be configured to accept, as input, one or more values to fill the one or more slots, and to cause the task associated with the dialog routine to be fulfilled, e.g., at a remote computing device as described previously. Dialog routines may be stored in various formats, and it is not critical in the context of the present disclosure which format is used.

In some implementations, various operations of FIG. 4, such as operations 402-408, may be omitted, particularly where a user explicitly requests that automated assistant 120 generate a dialog routine, rather than automated assistant 120 first failing to interpret something the user said. For example, a user could simply speak a phrase such as the following to automated assistant 120 to trigger creation of a dialog routine: "Hey assistant, I want to teach you a new trick," or something to that effect. That may trigger parts of method 400 that begin, for example, at block 410. Of course, many users may be unaware that automated assistant 120 is capable of learning dialog routines. Thus, it may be beneficial for automated assistant 120 to guide users through the process as described above with respect to blocks 402-408 when the user issues a command or request that automated assistant 120 cannot interpret.

Sometime later, at block 414, the system may receive, at one or more input components of the same client device 106 or a different client device 106 (e.g., another client device of the same coordinated ecosystem of client devices), a subsequent free form natural language input from the user. The subsequent free form natural language input may include the command or some syntactic and/or semantic variation thereof, which may invoke the dialog routine based on the mapping stored at block at block 412.

At block 416, the system may identify, based on the subsequent free form natural language input or additional free form natural language input (e.g., solicited from a user who fails to provide one or more required slot values at invocation of the dialog routine), one or more values to be used to fill the one or more slots that are required to be filled with values in order to fulfill the task associated with the dialog routine. For example, if the user simply invokes the dialog routine without providing values for any required slots, automated assistant 120 may solicit slot values from the user, e.g., one at a time, in batches, etc.

In some implementations, at block 418, the system, e.g., by way of task switchboard 134 and/or one or more of services 240-244, may transmit, e.g., to a remote computing device such as third party client device 248 and/or to a third party software agent 246, data that is indicative of at least the one or more values to be used to fill the one or more slots.

In various implementations, the transmitting may cause the remote computing device to fulfill the task. For example, if the remote computing device operates a third party software agent 246, then receipt of the data, e.g., from task switchboard 134, may trigger the third party software agent 246 to fulfill the task using the user-provided slot values.

Techniques described herein may be used to effectively "glue together" tasks that may be performed by a variety of different third party software applications (e.g., third party software agents). In fact, it is entirely possible to create a single dialog routine that causes multiple tasks to be fulfilled by multiple parties. For example, a user could create a dialog routine that is invoked with a phrase such as "Hey assistant, I want to take my wife to dinner and a movie." The user may define slots associated with multiple tasks, such as making a dinner reservation and purchasing movie tickets, in a single dialog routine. Slots for making a dinner reservation may include, for instance, a restaurant (assuming the user has already picked a specific restaurant), a cuisine type (if the user hasn't already picked a restaurant), a price range, a time range, a review range (e.g., above three stars), etc. Slots for purchasing movie tickets may include, for instance, a movie, a theater, a time range, a price range, etc. Later, when the user invokes this "dinner and a movie" reservation, to the extent the user doesn't proactively provide slot values to fill the various slots, automated assistant 120 may solicit such values from the user. Once automated assistant has slot values for all required slots for each task of the dialog routine, automated assistant 120 may transmit data to various remote computing devices as described previously to have each of the tasks fulfilled. In some implementations, automated assistant 120 may keep the user posted as to which tasks are fulfilled and which are still pending. In some implementations, automated assistant 120 may notify the user when all tasks are fulfilled (or if one or more of the tasks is not able to be fulfilled).

In some cases (regardless of whether multiple tasks are glued together in a single conversational reservation), automated assistant 120 may prompt the user for particular slot values by by first searching for potential slot values (e.g., movies that are in theaters, showtimes, available dinner reservations, etc.), and then presenting these potential slot values to the user, e.g., as suggestions or as an enumerated list of possibilities. In some implementations, automated assistant 120 may utilize various aspects of the user, such as the user's preferences, past user activity, etc., to narrow down such lists. For example, if the user (and/or the user's spouse) prefer a particular type of movie (e.g., highly reviewed, comedy, horror, action, drama, etc.), then automated assistant 120 may narrow down the list(s) of potential slot values before presenting them to the user.

Automated assistant 120 may take various approaches regarding payment that may be required for fulfillment of particular tasks (e.g., ordering a product, making a reservation, etc.). In some implementations, automated assistant 120 may have access to user-provided payment information (e.g., one or more credit cards) that automated assistant 120 may provide, e.g., to third party software agents 246 as necessary. In some implementations, when a user creates a dialog routine to fulfill a task that requires payment, automated assistant 120 may prompt the user for payment information and/or for permission to use payment information already associated with the user's profile. In some implementations in which the data indicative of the invoked dialog routine (including one or more slot values) is provided to a third party computing device (e.g., 248) to be output as natural language output, the user's payment information may or may not also be provided. Where it is not provided, e.g., when ordering food, the food vendor may simply request payment from the user when delivering the food to the user's door.

In some implementations, automated assistant 120 may "learn" new dialog routines by analyzing user engagement with one or more applications operating on one or more client computing devices to detect patterns. In various implementations, automated assistant 120 may provide natural language output to the user, e.g., proactively during an existing human-to-computer dialog or as another type of notification (e.g., pop up card, text message, etc.), which asks the user whether they would like to assign a commonly executed sequence of actions/tasks to an oral command, in effect building and recommending a dialog routine without the user explicitly asking for one.

As an example, suppose a user repeatedly visits a single food ordering website (e.g., associated with a restaurant), views a webpage associated with a menu, and then opens a separate telephone application that the user operates to place a call to a telephone number associated with the same food ordering website. Automated assistant 120 may detect this pattern and generate a dialog routine for recommendation to the user. In some implementations, automated assistant 120 may scrape the menu webpage for potential slots and/or potential slot values that can be incorporated into the dialog routine, and map one or more commands (which automated assistant 120 may suggest or that may be provided by the user) to a food ordering task. In this instance, the food ordering task may include calling the telephone number and outputting a natural language message (e.g., a robocall) to an employee of the food ordering website as described above with respect to PSTN 240.

Other sequences of actions for ordering food (or performing other tasks generally) could also be detected. For example, suppose the user typically opens a third party client application to order the food, and that the third party client application is a GUI-based application. Automated assistant 120 may detect this and determine, for instance, that the third party client application interfaces with a third party software agent (e.g., 246). In addition to interacting with the third party client application, this third party software agent 246 may already be configured to interactive with automated assistants. In such a scenario, automated assistant 120 could generate a dialog routine to interact with the third party software agent 246. Or, suppose the third party software agent 246 is not currently able to interact with automated assistants. In some implementations, automated assistant may determine what information is provided by the third party client application for each order, and may use that information to generate slots for a dialog routine. When the user later invokes that dialog routine, automated assistant 120 may fill the required slots and then based on these slots/slot values, generate data that is compatible with the third party software agent 246.

Figure 5:
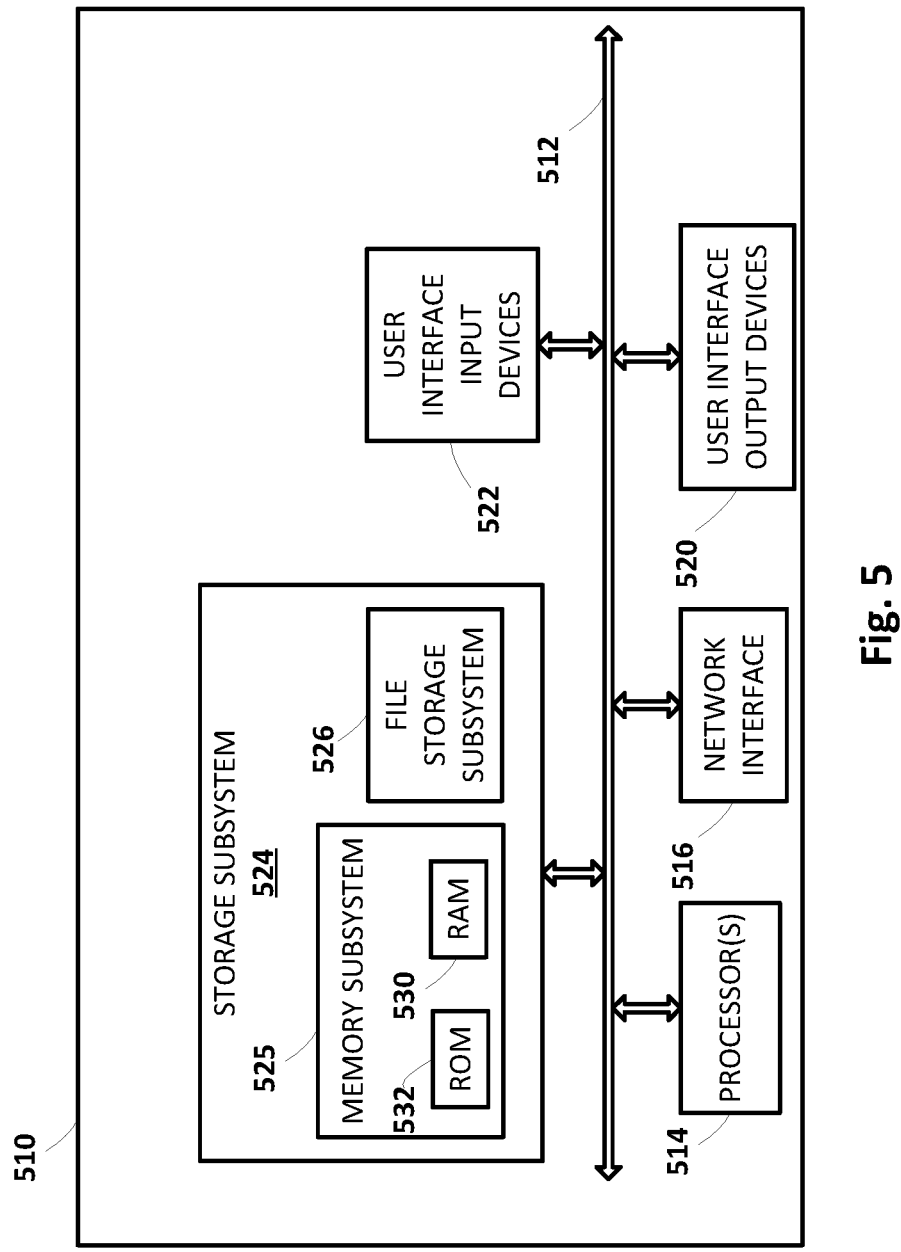
FIG. 5 illustrates an example architecture of a computing device.

FIG. 5 is a block diagram of an example computing device 510 that may optionally be utilized to perform one or more aspects of techniques described herein. In some implementations, one or more of a client computing device and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 4, as well as to implement various components depicted in FIGS. 1-3.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving, from a user at one or more input components of a computing device, one or more speech inputs directed at an automated assistant executed by one or more of the processors;
   performing speech recognition processing on the one or more speech inputs to generate speech recognition output;
   semantically processing the speech recognition output to identify, (i) a custom voice command, (ii) a task to be performed in response to receipt of the custom voice command by the automated assistant, and (iii) one or more slots that are required to be filled with values in order to fulfill the task;

creating and storing a custom dialog routine that includes a mapping between the custom voice command and the task, and which accepts, as input, one or more values to fill the one or more slots, wherein subsequent utterance of the custom command causes the automated assistant to engage in the custom dialog routine.

2. The method of claim 1, further comprising:
receiving, by the automated assistant, a subsequent speech input, wherein the subsequent speech input includes the custom command;
identifying, based on subsequent speech recognition output generated from the subsequent speech input, the custom command; and
causing the automated assistant to engage in the custom dialog routine based on identifying the custom command in the subsequent speech input and based on the mapping.

3. The method of claim 2, further comprising identifying, based on additional subsequent speech recognition output generated from the subsequent speech input or additional subsequent speech input, one or more values to be used to fill the one or more slots that are required to be filled with values in order to fulfill the task.

4. The method of claim 3, wherein the task to which the command is mapped comprises a third-party agent task, and the method further comprises transmitting, to a remote computing device, data that is indicative of at least the one or more values to be used to fill the one or more slots, wherein the transmitting causes a third party agent executing on the remote computing device to fulfill the third-party agent task.

5. The method of claim 2, further comprising:
generating, as part of engagement of the custom dialog routine by the automated assistant, natural language textual output that includes a request to perform the task and one or more values to fill the one or more of the slots while performing the task; and
transmitting the natural language textual output to a remote computing device, wherein the transmitting causes the remote computing device to render the natural language output at one or more output devices.

6. The method of claim 5, wherein the natural language textual output is transmitted to the remote computing device as part of a simple messaging service ("SMS") text message.

7. The method of claim 5, wherein the transmitting causes the remote device to audibly output the natural language textual output.

8. The method of claim 1, wherein the one or more speech inputs include a slot-filling speech input from the user, wherein the slot-filling speech input includes a user-provided enumerated list of possible values to fill one or more of the slots.

9. A system comprising one or more processors and memory storing instructions that, in response to execution of the instructions by the one or more processors, cause the one or more processors to perform the following operations
receive, from a user at one or more input components of a computing device, one or more speech inputs directed at an automated assistant executed by one or more of the processors;
perform speech recognition processing on the one or more speech inputs to generate speech recognition output;
semantically process the speech recognition output to identify, wherein the (i) a custom voice command, (ii) a task to be performed in response to receipt of the custom voice command by the automated assistant, and (iii) one or more slots that are required to be filled with values in order to fulfill the task;
create and storing a custom dialog routine that includes a mapping between the custom voice command and the task, and which accepts, as input, one or more values to fill the one or more slots, wherein subsequent utterance of the custom command causes the automated assistant to engage in the custom dialog routine.

10. The system of claim 9, further comprising instructions to:
receive, by the automated assistant, a subsequent speech input, wherein the subsequent speech input includes the custom command;
identify, based on subsequent speech recognition output generated from the subsequent speech input, the custom command; and
cause the automated assistant to engage in the custom dialog routine based on identifying the custom command in the subsequent speech input and based on the mapping.

11. The system of claim 10, further comprising instructions to identify, based on additional subsequent speech recognition output generated from the subsequent speech input or additional subsequent speech input, one or more values to be used to fill the one or more slots that are required to be filled with values in order to fulfill the task.

12. The system of claim 11, wherein the task to which the command is mapped comprises a third-party agent task, and the system further comprises instructions to transmit, to a remote computing device, data that is indicative of at least the one or more values to be used to fill the one or more slots, wherein the transmitting causes a third party agent executing on the remote computing device to fulfill the third-party agent task.

13. The system of claim 10, further comprising instructions to:
generate, as part of engagement of the custom dialog routine by the automated assistant, natural language textual output that includes a request to perform the task and one or more values to fill the one or more of the slots while performing the task; and
transmit the natural language textual output to a remote computing device, wherein the transmitting causes the remote computing device to render the natural language output at one or more output devices.

14. The system of claim 13, wherein the natural language textual output is transmitted to the remote computing device as part of a simple messaging service ("SMS") text message.

15. The system of claim 13, wherein the transmitting causes the remote device to audibly output the natural language textual output.

16. The system of claim 9, wherein the one or more speech inputs include a slot-filling speech input from the user, wherein the slot-filling speech input includes a user-provided enumerated list of possible values to fill one or more of the slots.

17. At least one non-transitory computer-readable medium comprising instructions that, in response to execution of the instructions by one or more processors, cause the one or more processors to perform the following operations:
receive, from a user at one or more input components of a computing device, one or more speech inputs directed at an automated assistant executed by one or more of the processors;

perform speech recognition processing on the one or more speech inputs to generate speech recognition output;

semantically process the speech recognition output to identify, (i) a custom voice command, (ii) a task to be performed in response to receipt of the custom voice command by the automated assistant, and (iii) one or more slots that are required to be filled with values in order to fulfill the task;

create and store a custom dialog routine that includes a mapping between the custom voice command and the task, and which accepts, as input, one or more values to fill the one or more slots, wherein subsequent utterance of the custom command causes the automated assistant to engage in the custom dialog routine.

18. The at least one non-transitory computer-readable medium of claim 17, further comprising instructions for:

receiving, by the automated assistant, a subsequent speech input, wherein the subsequent speech input includes the custom command;

identifying, based on subsequent speech recognition output generated from the subsequent speech input, the custom command; and causing the automated assistant to engage in the custom dialog routine based on identifying the custom command in the subsequent speech input and based on the mapping.

19. The at least one non-transitory computer-readable medium of claim 18, further comprising instructions for identifying, based on additional subsequent speech recognition output generated from the subsequent speech input or additional subsequent speech input, one or more values to be used to fill the one or more slots that are required to be filled with values in order to fulfill the task.

20. The at least one non-transitory computer-readable medium of claim 19, wherein the task to which the command is mapped comprises a third-party agent task, and the at least one non-transitory computer-readable medium further comprises instructions for transmitting, to a remote computing device, data that is indicative of at least the one or more values to be used to fill the one or more slots, wherein the transmitting causes a third party agent executing on the remote computing device to fulfill the third-party agent task.

* * * * *